(No Model.)
R. C. FAY.
OIL HOLE COVER FOR BICYCLE HUBS.
No. 579,794. Patented Mar. 30, 1897.
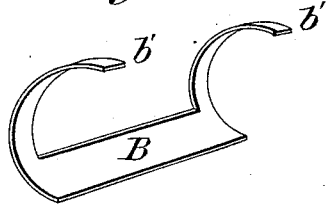
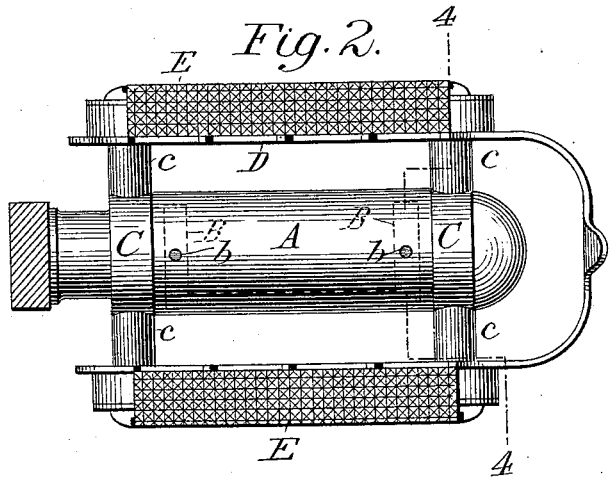
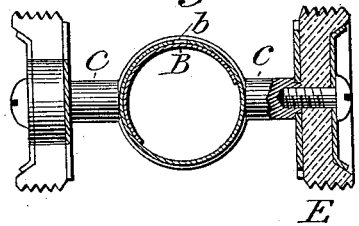
Witnesses:
Edwin B. Hopkinson.
M. Lawson Dyer.
Inventor:
Rimmon C. Fay
by
Kerr & Curtis, Atty's.

UNITED STATES PATENT OFFICE.

RIMMON C. FAY, OF ILION, NEW YORK, ASSIGNOR TO THE REMINGTON ARMS COMPANY, OF NEW YORK, N. Y.

OIL-HOLE COVER FOR BICYCLE-HUBS.

SPECIFICATION forming part of Letters Patent No. 579,794, dated March 30, 1897.

Application filed December 28, 1895. Serial No. 573,611. (No model.)

*To all whom it may concern:*

Be it known that I, RIMMON C. FAY, a citizen of the United States, residing at Ilion, in the county of Herkimer and State of New York, have invented certain new and useful Improvements in Dust-Proof Caps or Oil-Hole Covers for Bicycle and other Vehicle Hubs, of which I declare the following to be a full, clear, and exact description, reference being had to the accompanying drawings, which are a part of this specification.

Figure 1 is a perspective view of my invention detached. Fig. 2 is a plan view of a bicycle-pedal with my dust-proof cap (shown in dotted lines) in place therein. Fig. 3 is a section through line 4 4 of Fig. 2.

I shall for convenience describe my invention with reference to its application to a bicycle-pedal, with the understanding that it may be used with almost any vehicle-hub.

At or near the ends of a pedal-hub, such as A, formed of metal or other tubing, are bored certain holes, as $b\ b$, designed to admit oil to the ball-bearings, which are situated in the ends of the hub. Heretofore it has been customary to encircle the hub with one or more spring-clasps fitting over these holes to exclude dust and other dirt from entering to clog the bearings. Instead of such a construction I form a piece, such as B, as better shown in Fig. 1, out of resilient metal, preferably of steel. This piece, which I call a "dust-proof" cover, is adapted to fit securely within the hub, being approximately semicircular in cross-section at its ends $b'\ b'$, as better shown in Fig. 3, and cut away between the ends, as shown in Figs. 1 and 2, its diameter being slightly larger than the bore of the hub A. The ends $b'\ b'$ are of such a width and distance apart that when the cap B is inserted in the hub they will cover the oil-holes $b\ b$, and thereby exclude dirt. It is obvious that its resilience and form will prevent cover B from being displaced when within the hub, although it will readily allow oil to penetrate to the bearings.

What I claim as my invention is—

An internal oil-hole cover for tubular vehicle-bearings, consisting of a plate formed of resilient material extending lengthwise of the bearing, and bent to conform approximately to the contour of the bearing, and held in place by spring-arms integral therewith; substantially as described.

RIMMON C. FAY.

Witnesses:
F. N. QUAIFE,
J. M. O'ROURKE.